United States Patent Office 3,803,201
Patented Apr. 9, 1974

3,803,201
SYNTHESIS OF DIMETHYL CARBONATE
Jo Ann Gilpin and Albert H. Emmons, Midland, Mich., assignors to The Dow Chemical Company, Midland, Mich.
No Drawing. Filed Feb. 22, 1971, Ser. No. 117,818
Int. Cl. B01d *3/36;* C07c *69/00*
U.S. Cl. 260—463                    4 Claims

ABSTRACT OF THE DISCLOSURE

Dimethyl carbonate is made by the reaction of methanol with cyclic ethylene or 1,2-propylene carbonate wherein the desired product is removed as produced by distillation of the methanol-dimethyl carbonate azeotrope and is then separated from the azeotrope by low temperature crystallization and distillation.

BACKGROUND OF THE INVENTION

The production of dialkyl carbonates by the alcoholysis of cyclic vicinal alkylene carbonates is disclosed in the copending application of one of us (Jo Ann Gilpin) with Ludo K. Frevel entitled "Carbonate Synthesis," filed Feb. 12, 1969, Ser. No. 798,765 now Pat. 3,642,858. It is there taught that the dialkyl carbonate thus produced can be separated from the reaction mixture by any conventional technique, such as by distillation. However, when dimethyl carbonate is produced by the process there disclosed, it is found that (1) The reaction proceeds only to an equilibrium mixture containing a substantial proportion of unreacted alkylene carbonate, and (2) Distillation of the reaction mixture produces the desired dimethyl carbonate only in the form of its azeotrope with methanol, consisting of about ⅓ carbonate and ⅔ methanol. While this azeotropic mixture can be separated by known or obvious procedures, such as selective extraction of the methanol or carbonate with a selective solvent, these methods are tedious and inefficient, thus indicating a need for better methods. Also, it would be highly desirable to have the reaction go essentially to completion rather than stopping at the equilibrium point.

Accordingly, it is an object of the present invention to provide a method for making dimethyl carbonate by the methanolysis of cyclic vicinal alkylene carbonate wherein essentially all of the alkylene carbonate is converted and the dimethyl carbonate is readily and efficiently separated from the reaction mixture.

The methanolysis of alkylene carbonates is a reversible reaction which can be represented as follows:

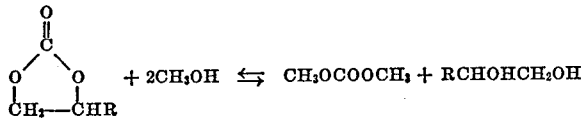

It has long been known from the law of mass action that in a reversible reaction the reaction can be shifted in either direction by removing one of the products produced in the reaction to be favored. Such product, of course, is one of the reactants in the reverse reaction. The usual way of applying this principle to a reaction such as that here involved is to remove one of the products by distillation. Here, however, this approach is complicated by the fact that the most volatile component of the reaction mixture is methanol, which is a reactant rather than a product in the reaction to be favored. Moreover, the most volatile product, dimethyl carbonate, is known to form an azeotrope with methanol. Since this azeotrope consists of methanol and dimethyl carbonate in a molar ratio of about 5:1 (weight ratio about 2:1), it is evident that distillation of this azeotrope removes a reactant (methanol) much faster than it removes the desired product (dimethyl carbonate). Thus, it might be expected that such distillation would favor reversal of the desired reaction since it rapidly removes a product of the reverse reaction.

SUMMARY OF THE INVENTION

According to the invention, the process of methanolysis of cyclic alkylene carbonates is carried out by distillation of the methanol-dimethyl carbonate azeotrope during the reaction, and the dimethyl carbonate is isolated from the azeotrope by a combination of low temperature crystallization and fractional distillation.

DETAILED DESCRIPTION OF THE INVENTION

The methanolysis of alkylene carbonates is conveniently accomplished by reacting a substantial excess of methanol with the alkylene carbonate, at the boiling point of the reaction mixture, in the presence of a catalytic amount of a basic catalyst, and with continuous or intermittent removal of the methanol-dimethyl carbonate azeotrope by distillation. In this way the reaction can be carried essentially to completion, though as a practical matter it may be preferred to stop somewhat short of full completion and then recycle the unconverted alkylene carbonate. Alternatively, the reaction can be conducted in a continuous manner wherein methanol and alkylene carbonate are continuously or intermittently fed to the reactor to replace that which has been consumed or removed. In either case, the driving force is the removal of the azeotrope.

The reaction is catalyzed by alkali metal bases, e.g., the alkali metals or their oxides, hydroxides, alkoxides, amides and carbonates. The preferred catalysts are sodium and potassium hydroxides and methoxides. Typical catalytic amounts of the order of 0.01 to 0.3% by weight, based on total reactants, are suitable.

During the reaction a stoichiometric excess of methanol should be present in the reaction mixture. When the reaction is conducted batchwise, at least about 5 moles of methanol, and preferably at least 10, per mole of alkylene carbonate should be charged to the reactor. When the operation is conducted continuously or semi-continuously, the methanol can be separated from the azeotrope and recycled to the reactor so as to maintain the desired excess therein while reducing the total amount of methanol involved in the process at any given time.

In the second aspect of the invention, the methanol-dimethyl carbonate azeotrope produced in the reaction stage is separated and the carbonate is isolated in essentially pure form. This separation is most conveniently effected by a combination of low temperature crystallization and fractional distillation steps.

In the crystallization step the azeotropic mixture is cooled until a substantial solid phase, rich in dimethyl carbonate, forms. This is separated from the methanol-rich liquid phase and each phase is then further purified, as by fractional distillation. Distillation of the solid phase produces a distillate that is essentially the azeotropic mixture and a residue (or second distillate) that is essentially pure dimethyl carbonate. Distillation of the methanol-rich liquid phase from the crystallization step produces a first fraction that is essentially the azeotropic mixture and a second fraction that is essentially pure methanol. The azeotropic fractions from these distillations are recycled to the crystallizer while the methanol fraction is recycled to the reactor.

In the above crystallization step, the efficiency of the separation is largely dependent on the temperature at which the separation is made. As the azeotropic mixture is cooled, a solid phase appears at about −30° C. and increases as the temperature is lowered. At −35° C. about 36% of the mixture solidifies. The solid phase then consists of about 38% by weight of methanol and 62% of dimethyl carbonate while the liquid phase consists of about 79% methanol and 21% dimethyl carbonate. Distillation of these fractions produces the azeotrope until the lesser component is exhausted, leaving essentially pure dimethyl carbonate and methanol, respectively.

In the practice of the invention, the distillation of the azeotrope (B.P., 63° C.) involves separating the azeotrope from excess methanol (B.P., 64.6° C.). A clean separation requires a highly efficient fractionating column. However, a partial separation is effective to drive the reaction because the dimethyl carbonate is effectively removed, even though the distillate contains more methanol than needed to form the azeotrope. Such distillates containing as little as 8–10% of dimethyl carbonate can be further concentrated in the crystallization step or, alternatively, they can be redistilled to yield a concentrate closer in composition to the azeotropic mixture, which concentrate is then subjected to the crystallization step.

SPECIFIC EMBODIMENTS

The following examples illustrate the practice of the invention.

Example 1.—Methanolysis of ethylene carbonate

A mixture of 14 m. of methanol, 2 m. of ethylene carbonate and 0.5 g. of sodium methoxide was refluxed with slow distillation (5:1 reflux ratio) through a 12 in. Vigreaux column. An additional 14 m. of methanol was slowly added during the reaction period. The initial distillate was collected at 63° and was essentially the methanol-dimethyl carbonate azeotrope. As the reaction proceeded the proportion of methanol in the distillate slowly increased. When the production of dimethyl carbonate had substantially ceased (941 g. of distillate), the distillate was cooled to −70° C. for crystallization while the reactor contents were distilled to recover the excess methanol and the by-product, ethylene glycol.

The chilled distillate was stirred at −70° until separation of solid ceased and was then filtered to produce (A) 674 g. (73%) of filtrate consisting of 644 g. (95.5%) methanol and 30.3 g. (4.5%) of dimethyl carbonate, and (B) 249 g. (27%) of solid containing 142 g. (57.3%) of dimethyl carbonate and 106 g. (42.7%) of methanol.

Thus, the total yield of dimethyl carbonate was 172 g., 96% of theory, based on ethylene carbonate charged.

Distillation of fractions corresponding to (A) and (B), above, produces the azeotrope as first fractions and essentially pure methanol and dimethyl carbonate, respectively, as second fractions.

Example 2.—Methanolysis of propylene carbonate

In an experiment similar to Example 1, one mole of 1,2-propylene carbonate was reacted with 14 m. of methanol, the catalyst being 0.5 g. of sodium methoxide. The distillate collected during the reaction contained 18.5% by weight of dimethyl carbonate, corresponding to a yield of 95.5%, based on propylene carbonate charged. It was separated by low temperature crystallization in the same way as that of Example 1.

We claim:
1. In the process of making dimethyl carbonate by the methanolysis of alkylene carbonate, the improvement of removing the dimethyl carbonate from the reaction mixture during the reaction by distilling a mixture of methanol and dimethyl carbonate from the reaction mixture.
2. The process of claim 1 wherein the alkylene carbonate is ethylene carbonate or 1,2-propylene carbonate.
3. The process of claim 1 wherein the mixture of methanol and dimethyl carbonate is cooled until partially solidified and is then separated into a methanol-rich liquid fraction and a dimethyl carbonate-rich solid fraction.
4. The process of claim 3 wherein the mixture of methanol and dimethyl carbonate contains at least about 8%, by weight, of dimethyl carbonate.

References Cited

UNITED STATES PATENTS 3,642,858   2/1972   Frevel et al. _____ 260—463

OTHER REFERENCES

Condensed Chemical Dictionary, 6th ed. Reinhold, N.Y., 1961, pp. 317, 724–25 and 734–35.

Mullin; "Crystallization," Butterworth's, London (1961), p. 158.

LEWIS GOTTS, Primary Examiner

D. G. RIVERS, Assistant Examiner

U.S. Cl. X.R.

203—48 63